US008907866B2

(12) United States Patent
Kato

(10) Patent No.: US 8,907,866 B2
(45) Date of Patent: Dec. 9, 2014

(54) HEAD MOUNT DISPLAY

(75) Inventor: Shigeru Kato, Kawasaki (JP)

(73) Assignee: Nikon Corporation, Tokyo (JP)

(*) Notice: Subject to any disclaimer, the term of this patent is extended or adjusted under 35 U.S.C. 154(b) by 490 days.

(21) Appl. No.: 12/310,719

(22) PCT Filed: Sep. 11, 2007

(86) PCT No.: PCT/JP2007/000992
§ 371 (c)(1),
(2), (4) Date: Mar. 5, 2009

(87) PCT Pub. No.: WO2008/032448
PCT Pub. Date: Mar. 20, 2008

(65) Prior Publication Data
US 2009/0243967 A1 Oct. 1, 2009

(30) Foreign Application Priority Data

Sep. 13, 2006 (JP) ................................. 2006-248329
Sep. 13, 2006 (JP) ................................. 2006-248330

(51) Int. Cl.
*G09G 5/00* (2006.01)
*G02B 27/01* (2006.01)
(52) U.S. Cl.
CPC ...... *G02B 27/017* (2013.01); *G02B 2027/0187* (2013.01); *G02B 2027/014* (2013.01); *G02B 2027/0156* (2013.01)
USPC ............................................................ 345/8
(58) Field of Classification Search
USPC ............................................................ 345/8
See application file for complete search history.

(56) References Cited

U.S. PATENT DOCUMENTS

| 5,051,931 | A | * | 9/1991 | Cheu et al. | 600/558 |
| 5,864,346 | A | * | 1/1999 | Yokoi et al. | 345/501 |
| 6,050,717 | A | * | 4/2000 | Kosugi et al. | 700/17 |
| 6,160,666 | A | * | 12/2000 | Rallison et al. | 359/630 |
| 7,827,110 | B1 | * | 11/2010 | Wieder | 705/52 |
| 2004/0086258 | A1 | * | 5/2004 | McGee et al. | 386/46 |
| 2004/0239685 | A1 | * | 12/2004 | Kiyokawa et al. | 345/619 |

(Continued)

FOREIGN PATENT DOCUMENTS

| GB | 2427952 A | * | 1/2007 |
| JP | A-9-93513 | | 4/1997 |
| JP | A-10-65997 | | 3/1998 |
| JP | A-2000-005448 | | 1/2000 |
| JP | A-2004-207772 | | 7/2004 |

(Continued)

OTHER PUBLICATIONS

Apr. 3, 2012 Notification of Reasons for Refusal issues in JP Application No. 2006-248329 w/translation.

(Continued)

*Primary Examiner* — Alexander S Beck
*Assistant Examiner* — Kirk Hermann
(74) *Attorney, Agent, or Firm* — Oliff PLC

(57) ABSTRACT

A displaying unit displaying an image, a recognizing unit recognizing use history of the displaying unit, and a decision unit deciding a permissible viewing time of the image for a user, based on the use history are provided, and the display of the image by the displaying unit is stopped according to the permissible viewing time. Alternatively, the user is encouraged to finish watching the image according to the permissible viewing time. In a head mount display including a displaying unit and mountable on the head of a user, it is possible to realize a fatigue countermeasure appropriate for a user.

14 Claims, 12 Drawing Sheets

(56) References Cited

U.S. PATENT DOCUMENTS

| | | | |
|---|---|---|---|
| 2005/0195277 A1* | 9/2005 | Yamasaki | 348/61 |
| 2006/0004871 A1* | 1/2006 | Hayama et al. | 707/104.1 |
| 2006/0225105 A1* | 10/2006 | Russ | 725/78 |
| 2007/0047911 A1* | 3/2007 | Haruki | 386/95 |
| 2007/0097021 A1* | 5/2007 | Yamazaki et al. | 345/8 |
| 2009/0034931 A1* | 2/2009 | Stone et al. | 386/52 |

FOREIGN PATENT DOCUMENTS

| | | |
|---|---|---|
| JP | A-2005-166172 | 6/2005 |
| WO | WO 2007072270 A1 * | 6/2007 |

OTHER PUBLICATIONS

Feb. 25, 2014 Office Action issued in Japanese Patent Application No. 2013-089093 (with English translation).

* cited by examiner

FIG. 9A
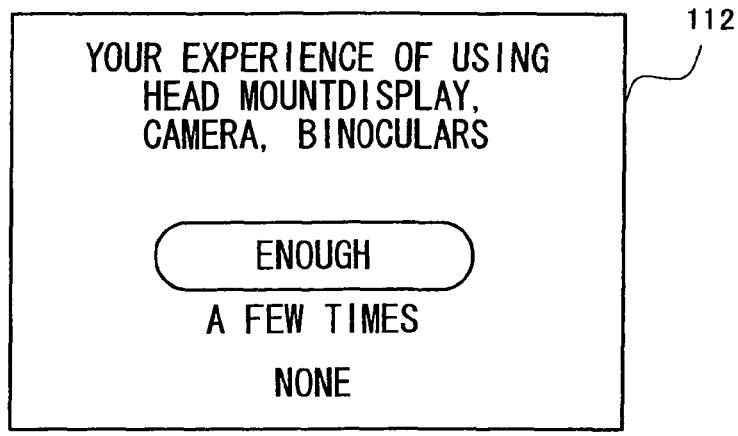
FIG. 9B
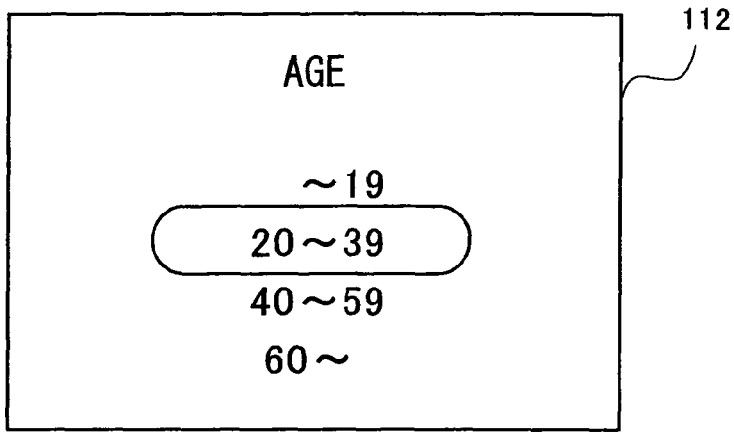
FIG. 9C
| USER INFORMATION | | EVALUATION VALUE |
|---|---|---|
| EXPERIENCE OF USING AN EYEPIECE OPTICAL INSTRUMENT | ENOUGH | F1 |
| | A FEW TIMES | F2 |
| | NONE | F3 |
| AGE | ~19 | F4 |
| | 20~39 | F5 |
| | 40~59 | F6 |
| | 60~ | F7 |

HEAD MOUNT DISPLAY

CROSS-REFERENCE TO RELATED APPLICATION

This application is a U.S. National Stage application claiming the benefit of prior filed International Application Number PCT/JP2007/000992, filed Sep. 11, 2007, in which the International Application claims a priority date of Sep. 13, 2006 based on prior filed Japanese Application Number 2006-248329 and Japanese Application Number 2006-248330, the entire contents of which are incorporated herein by reference.

TECHNICAL FIELD

The present invention relates to a head mount display including a displaying unit and mountable on the head of a user.

BACKGROUND ART

With the recent miniaturization of a display element and the like, a display device such as a head mount display mountable on the head of a user has been contrived. Such a display device tends to cause fatigue of a user who is not accustomed to using it. Further, a user not accustomed to using it cannot be sometimes aware of his/her fatigue Therefore, an invention of a patent document 1 solves this problem by interrupting the image display after a pre-set time.

Patent document 1: Japanese Unexamined Patent Application Publication No. 2004-207772

DISCLOSURE

Problems to be Solved

However, whether or not a user is accustomed to the use depends on the user's use experience and the like. Further, how soon a user feels fatigue greatly differs depending on an ocular function of each user. Therefore, if the image display is interrupted after a predetermined time as in the patent document 1, there sometimes occurs a case where the image display is interrupted even when a user does not yet feel fatigue or a case where the image display is continued even when a user has already felt fatigue.

It is a proposition of the present invention to realize a fatigue countermeasure appropriate for each user in a head mount display including a displaying unit and mountable on the head of the user.

Means for Solving the Problems

A head mount display of the present invention includes: a displaying unit displaying an image; a recognizing unit recognizing a use history of the displaying unit; a decision unit deciding a permissible viewing time of the image for a user based on the use history; and a controlling unit stopping the display of the image by the displaying unit according to the permissible viewing time.

Another head mount display of the present invention includes: a displaying unit displaying an image; a recognizing unit recognizing a use history of the displaying unit; a decision unit deciding a permissible viewing time of the image for a user based on the use history; and a controlling unit encouraging the user to finish watching the image according to the permissible viewing time.

Preferably, the recognizing unit may recognize at least one of a number of times of use, operating hours per use, accumulated operating hours, and a time required for adjusting the displaying unit before use as the use history.

Another head mount display of the present invention includes: a displaying unit displaying an image; an obtaining unit obtaining a user information; a decision unit deciding a permissible viewing time of the image for a user according to the user information; and a controlling unit stopping the display of the image by the displaying unit, according to the permissible viewing time.

Another head mount display of the present invention includes: a displaying unit displaying an image; an obtaining unit obtaining a user information; a decision unit deciding a permissible viewing time of the image for a user based on the user information; and a controlling unit encouraging the user to finish watching the image according to the permissible viewing time.

Preferably, the obtaining unit may obtain one of experience and inexperience of using an eyepiece optical instrument by the user as the user information.

Preferably, the obtaining unit may obtain at least one of sex and age of the user as the user information.

Preferably, the controlling unit may correct a stopping time decided according to the permissible viewer time when stopping the display of the image by the displaying unit.

Preferably, the controlling unit may correct the stopping time based on an information of content data of the image which is an object to be displayed by the displaying unit.

Preferably, the controlling unit may detect a scene change of the content data to correct the stopping time based on a position of the scene change.

Preferably, the controlling unit may correct the stopping time based on control information of the content data appended to the content data.

Preferably, an accepting unit accepting a user's instruction for extending the stopping time may be provided, and the controlling unit may correct the stopping time based on the user's instruction.

Preferably, the accepting unit may accept the user's instruction in a predetermined time period including at least one of periods before and after the stopping time.

Preferably, a selecting unit selecting whether or not control by the controlling unit is to be performed based on the user's instruction may be further provided.

Effect

According to the present invention, it is possible to realize a fatigue countermeasure appropriate for a user in a head mount display including a displaying unit and mountable on the head of a user.

BRIEF DESCRIPTION OF THE DRAWINGS

FIG. 9 are views explaining user information.

DETAILED DESCRIPTION OF THE EMBODIMENTS

First Embodiment

Hereinafter, a first embodiment of the present invention will be described based on the drawings.

Figure 1:
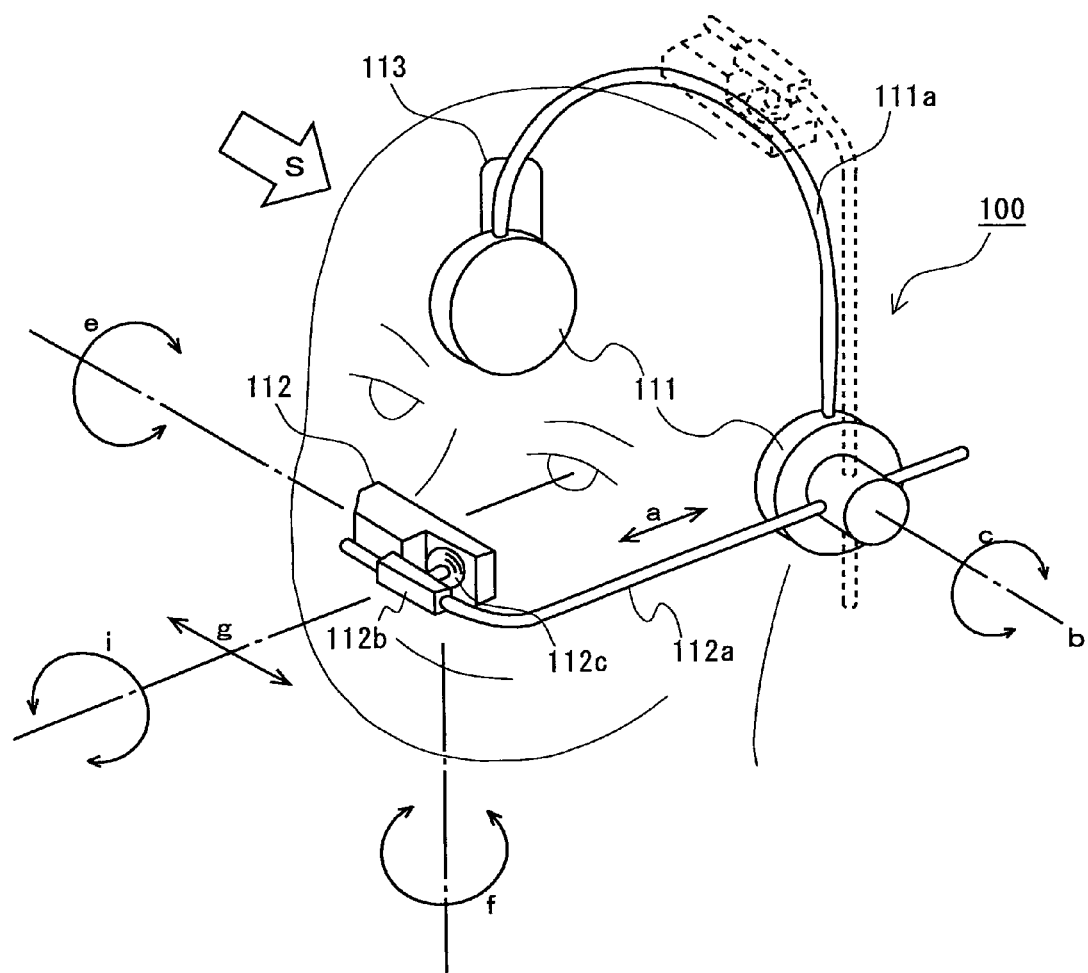
FIG. 1 is an appearance view of a head mount display 100.
Figure 2A:
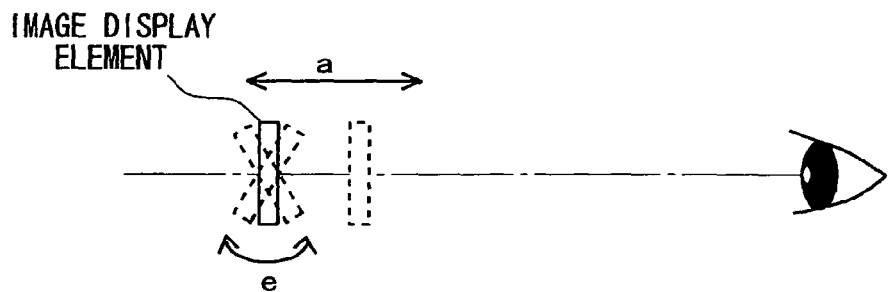
FIG. 2 are views showing relations between an image display element included in a displaying part 112 and eyes of a user.
Figure 2B:
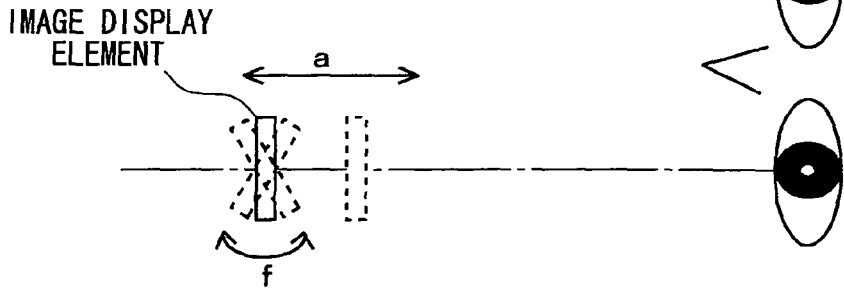
Figure 2C:
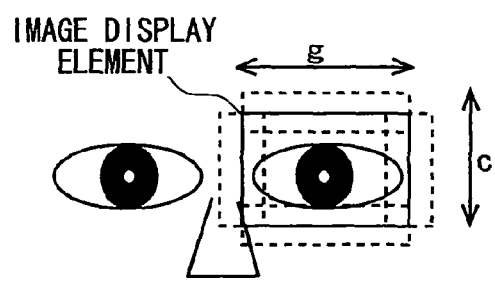
Figure 2D:
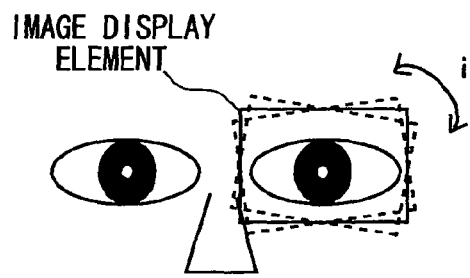

FIG. 1 is an appearance view of a head mount display 100. As shown in FIG. 1, the head mount display 100 includes speakers 111, a combining part 111a, a displaying part 112, a supporting arm 112a, and an operating part 113. When it is worn, the speakers 111 are worn on ears of a user, and owing to elasticity of the combining part 111a, the speakers 111 are held on the ears of the user. The displaying part 112 includes: a not-shown image display element such as a transmissive LCD or an organic EL display; and a not-shown optical system magnifying video of the image display element to project it on the eyes of the user. As the image display element, an image display element such as a reflective LCD or that having two-dimensionally arranged self-luminous elements may be used.

The displaying part 112 is formed integrally with the supporting arm 112a. The supporting arm 112a slides to move in the direction of the arrow a in FIG. 1 relative to the speaker 111. During image watching, the displaying part 112 and the supporting arm 112a are disposed at the positions shown by the solid lines in FIG. 1. During a period except the image watching time, the displaying part 112 and the supporting arm 112a are rotated with respect to an axis b, so that the displaying part 112 is disposed on the top of the user's head (position shown by the dotted line in FIG. 1). As a result, during the period except the image watching time, the displaying part 112 does not block a user's view since it is disposed on the top of the user's head. Further, the supporting arm 112a is rotatable in the direction of the arrow c in FIG. 1 with respect to the axis b in FIG. 1 relative to the speaker 111 by a not-shown driving part. Therefore, the aforesaid sliding in the direction of the arrow a and rotation in the direction of the arrow c enable correct adjustment of the position of the displaying part 112 so that the displaying part 112 comes in front of the eyes of the user.

Further, the displaying part 112 has, between itself and the supporting arm 112a, a sliding member 112b and a ball bearing 112c, and thus finer adjustment of its position and inclination is possible based on a user's operation. FIG. 2 show relations between the image display element included in the displaying part 112 and the eyes of the user. As shown in the side view in FIG. 2A, sliding the supporting arm 112a in the direction of the arrow a allows the displaying part 112 to slide in the direction of the arrow a, which enables the adjustment of its back and forth position relative to the eyes of the user. Further, the displaying part 112 is rotatable in the direction of the arrow e by the ball bearing 112c, and is rotatable in the direction of the arrow f as well by the ball bearing 112c as shown in the top view in FIG. 2B. Therefore, the adjustment of the inclination relative to the eyes of the user is possible. Further, as shown in the front view in FIG. 2C, the displaying part 112 is slidable in the direction of the arrow g by the sliding member 112b, so that its right and left position relative to the eyes of the user is adjustable. Further, as shown in the front view in FIG. 2D, the displaying part 112 is rotatable in the direction of the arrow i by the ball bearing 112c. Therefore, the inclination in a plane vertical to an optical axis of the eyes of the user is adjustable.

Figure 3:
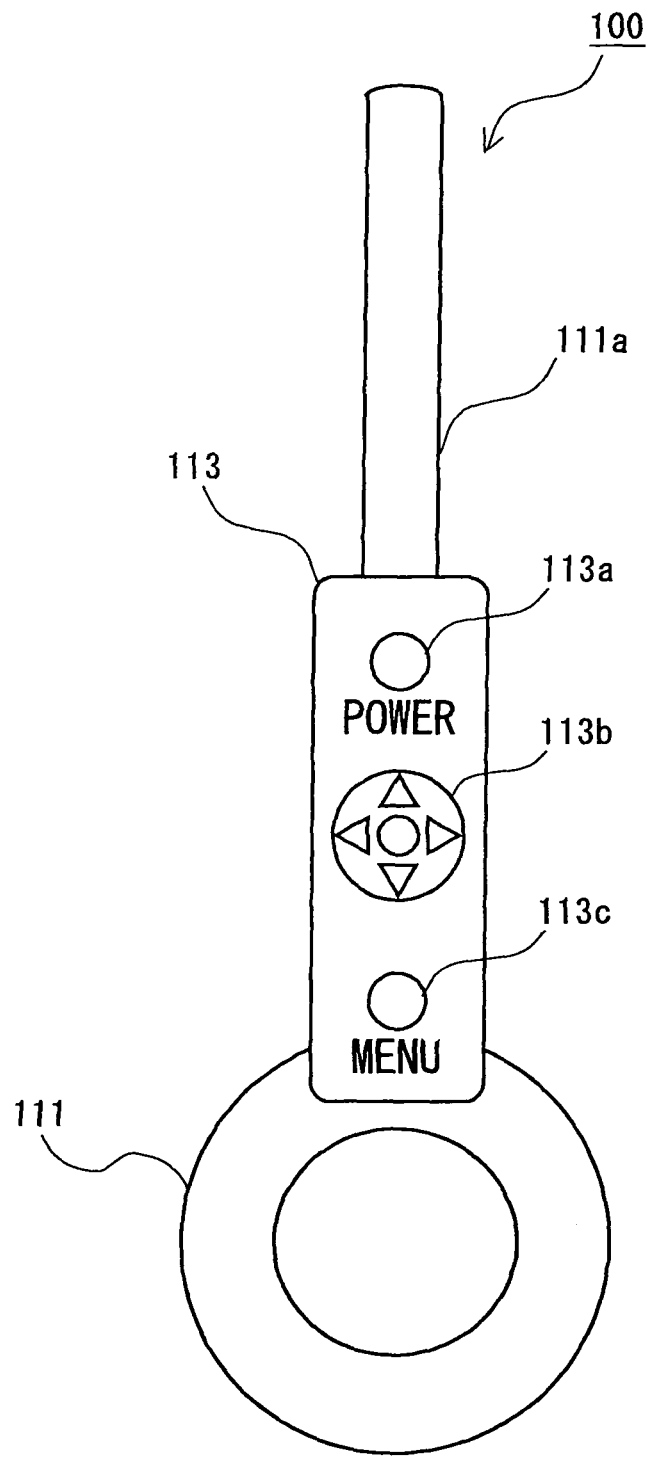
FIG. 3 is a side view of the head mount display 100 seen in the direction of the arrow S in FIG. 1.

As shown in FIG. 1, the operating part 113 is disposed near the right-ear speaker 111 on the temporal region of the user. FIG. 3 is a side view of the head mount display 100 seen in the direction of the arrow S in FIG. 1. As shown in FIG. 3, the operating part 113 includes a power button 113a, a cross button 113b, and a menu button 113c. Incidentally, the operating part 113 may be disposed outside the head mount display 100 similarly to a remote controller. In this case, the remote controller and the head mount display 100 may be wire-coupled or may be wirelessly coupled.

Figure 4:
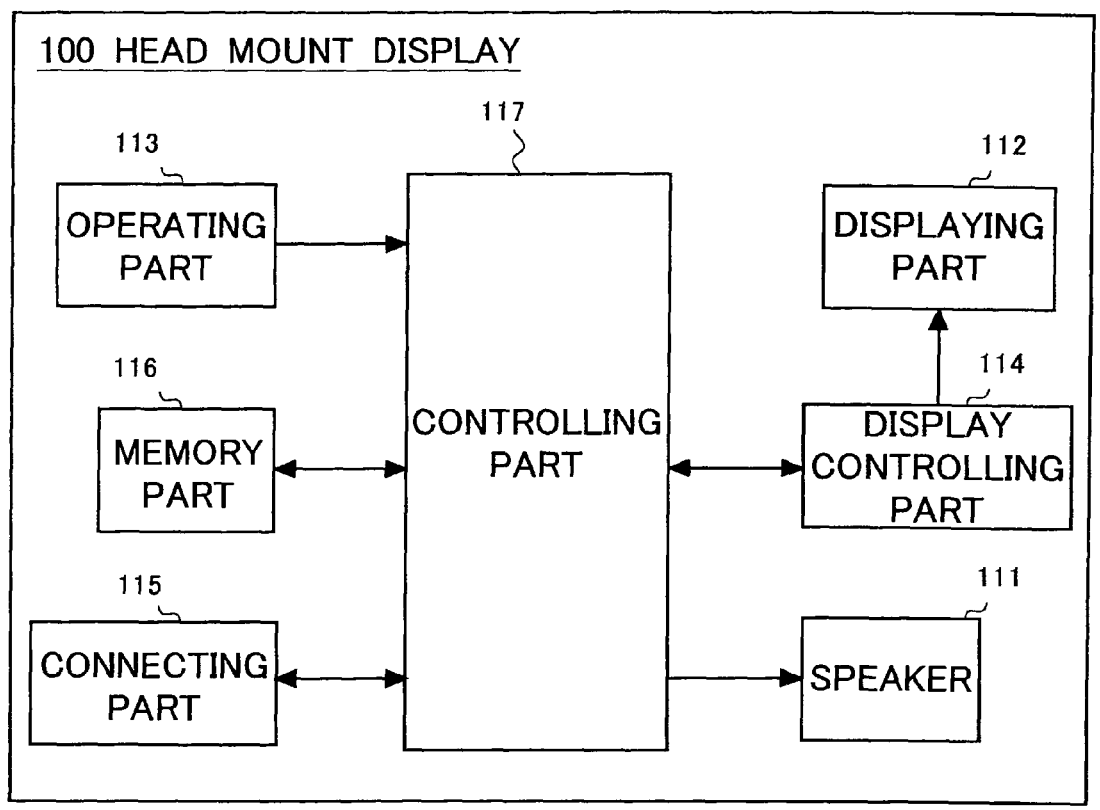
FIG. 4 is a functional block diagram of the head mount display 100.

FIG. 4 is a functional block diagram of the head mount display 100.

As shown in FIG. 4, in addition to the speakers 111, the displaying part 112, and the operating part 113, the head mount display 100 includes various parts, that is, a display controlling part 114 controlling the display on the displaying part 112, a connecting part 115 coupled to an external device such as a computer via a cable or the like, a memory part 116 storing image information which is to be displayed on the displaying part 112, audio information which is to be output to the speakers 111, and the like, and a controlling part 117 controlling these parts. Hereinafter, image information, audio information, and image information with audio will be collectively referred to as "content data".

The controlling part 117 is mutually coupled to each of the display controlling part 114, the connecting part 115, and the memory part 116. Further, an output of the display controlling part 114 is coupled to the displaying part 112. The controlling part 117 detects the state of the operating part 113 and causes the speakers 111 to reproduce audio and the displaying part 112 to display an image, according to a user's instruction given via the operating part 113. Further, the controlling part 117 includes a not-shown timer inside. The controlling part 117 further performs recording and recognition of use history, which is a feature of the present invention. The use history is a use history concerning the image display using the displaying part 112. That is, the use of the head mount display 100 only for reproducing audio information is not included in the use history. The use history includes the number of times of use, operating hours per use, accumulated operating hours, the time required for adjusting the displaying part 112 before use, and the like. As for the time required for adjustment, when the aforesaid adjustment of each part of the displaying part 112 is made (see FIG. 1 and FIG. 2), the controlling part 117 detects this and measures and records the time required for the adjustment. The controlling part 117 updates the use history every time the user uses the head mount display 100.

The operation of the controlling part 117 when content data is reproduced in the head mount display 100 having the configuration described above will be described by using the flowchart in FIG. 5.

At Step S1, the controlling part 117 determines whether or not image reproduction has been instructed via the operating part 113. When the image reproduction has not been instructed, the controlling part 117 executes the same processing as that of publicly known arts according to the instruction. For example, when audio reproduction is instructed, it executes the audio reproduction in the same manner as in the publicly known arts. When image reproduction is instructed, the controlling part 117 goes to Step S2.

At Step S2, the controlling part 117 reads the use history. This embodiment will describe an example where the number of times of use is read.

Figure 6A:
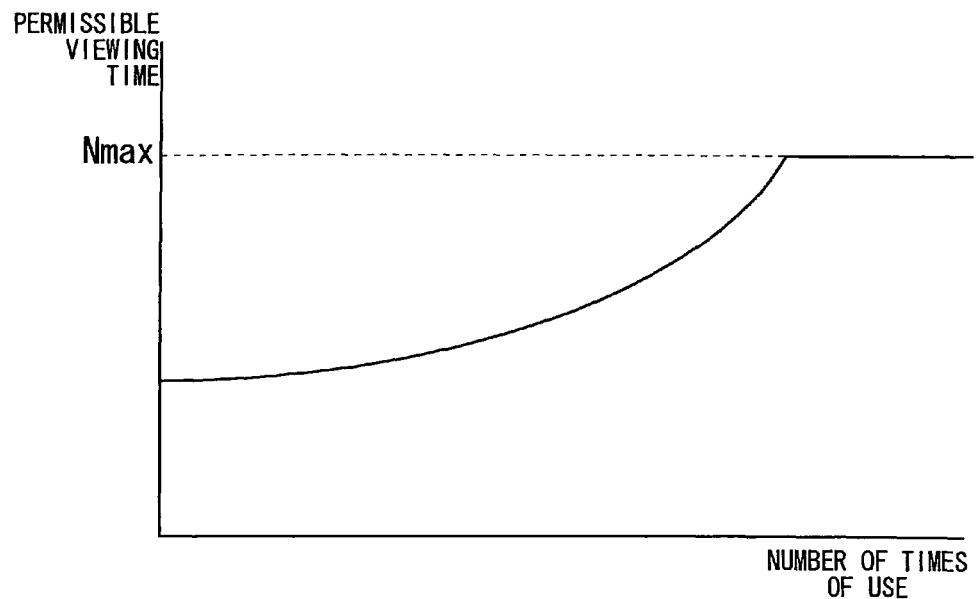
FIG. 6 are charts explaining how a permissible viewing time A is decided.

At Step S3, the controlling part 117 decides a permissible viewing time A. The controlling part 117 decides the permissible viewing time A based on the number of times of use recognized at Step S2. FIG. 6A shows an example of a relation between the number of times of use and the permissible viewing time A. As shown in FIG. 6A, the number of times of use and the permissible viewing time A is in a positive correlation. The larger the number of times of use, the longer the permissible viewing time A. However, considering fatigue of a user, it is preferable to set an upper limit (Nmax) to the permissible viewing time A.

Figure 6B:
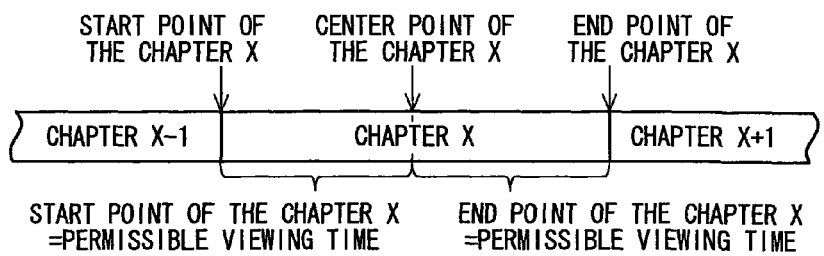

Further, in deciding the permissible viewing time A, the permissible viewing time A may be decided in consideration of information of content data of an object to be reproduced. For example, the permissible viewing time A may be decided based on control information appended to the content data. When chapter information is present as the control information appended to the content data, the permissible viewing time A is preferably decided at a point after the permissible viewing time has passed from a reproduction start point, so that the permissible viewing time ends in timing with a chapter change point near the above point. Stopping the reproduction according to the permissible viewing time A decided irrespective of the contents of the content data would sometimes make a user feel unpleasant. On the other hand, deciding the permissible viewing time A in the above manner makes it possible to stop the reproduction without making the user feel unpleasant. FIG. 6B shows an example of the chapter information. When content data of an object to be reproduced has a plurality of chapters as shown in FIG. 6B, the permissible viewing time A is corrected according to the structure of the chapters. For example, a point at which the permissible viewing time A decided according to the relation in FIG. 6A has passed from a reproduction start point is a middle of a chapter X in FIG. 6B, the permissible viewing time A is decided so as to end in timing with a start point or an end point of the chapter X. When the permissible viewing time A decided according to the relation in FIG. 6A ends before a center point of the chapter X, the permissible viewing time A is decided so as to end in timing with the start point of the chapter X, and when the permissible viewing time A decided according to the relation in FIG. 6A ends after the center point of the chapter X, the permissible viewing time A is decided so as to end in timing with the end point of the chapter X.

An alternative structure may be to detect a scene change of the content data of the object to be reproduced and decide the permissible viewing time A based on a position of the scene change. Preferably, the scene change in the content data is detected based on a change in brightness, and the permissible viewing time A decided according to the relation in FIG. 6A is corrected so as to end in timing with the scene change point. By thus deciding the permissible viewing time A, it is possible to stop the reproduction without making the user feel unpleasant as in the above example using the chapter information.

At Step S4, the controlling part 117 starts the image reproduction via the display controlling part 114. When the content data of the object to be reproduced is image information with audio, the controlling part 117 starts audio reproduction via the speakers 111 as well.

At Step S5, the controlling part 117 starts the timer in the controlling part 117.

At Step S6, the controlling part 117 determines whether or not the timer=A−T1. T1 is a predetermined time period (for example, "five minutes" or the like). The controlling part 117 waits until the timer=A−T1, and goes to Step S7 when determining that the timer=A−T1.

Figure 7A:
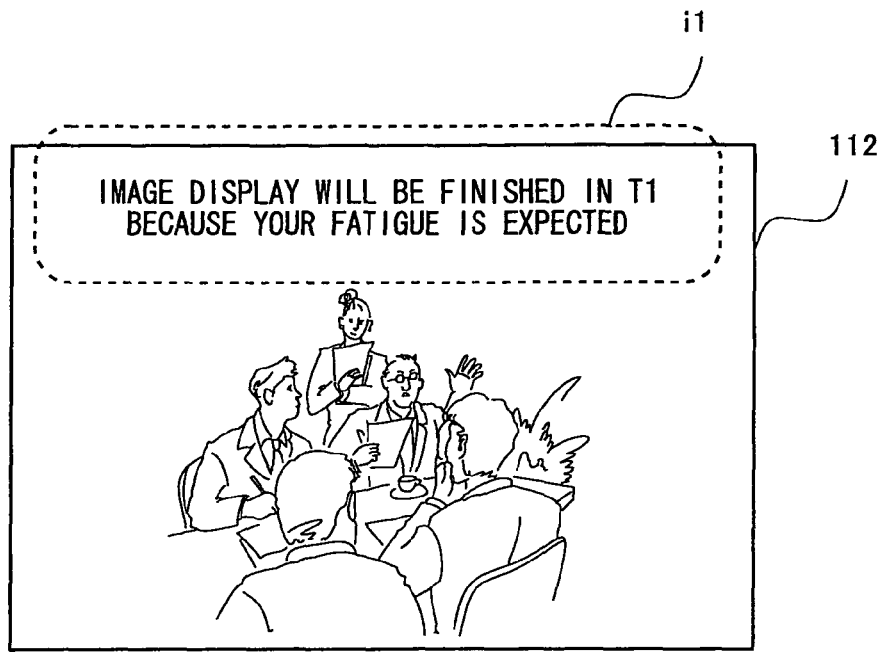
FIG. 7 are views showing display examples on the displaying part 112.

At Step S7, the controlling part 117 gives a warning. The warning is realized by, for example, a message displayed on the displaying part 112. FIG. 7A shows a display example of the warning. In the example in FIG. 7A, an image (i1) showing the warning is displayed in a superimposed manner on a currently displayed image. It should be noted that the example in FIG. 7A is an example, and an image encouraging the user to stop watching the image (for example, "Stop watching the image because your fatigue is expected" or the like) may be displayed.

The warning described at Step S7 is given the time T1 prior to the end of the permissible viewing time A decided at Step S3. Further, audio information via the speakers 111 may be used as the warning.

At Step S8, the controlling part 117 determines whether or not the timer=A. The controlling part 117 waits until the time=A, and goes to Step S9 when determining that the timer=A.

Figure 7B:
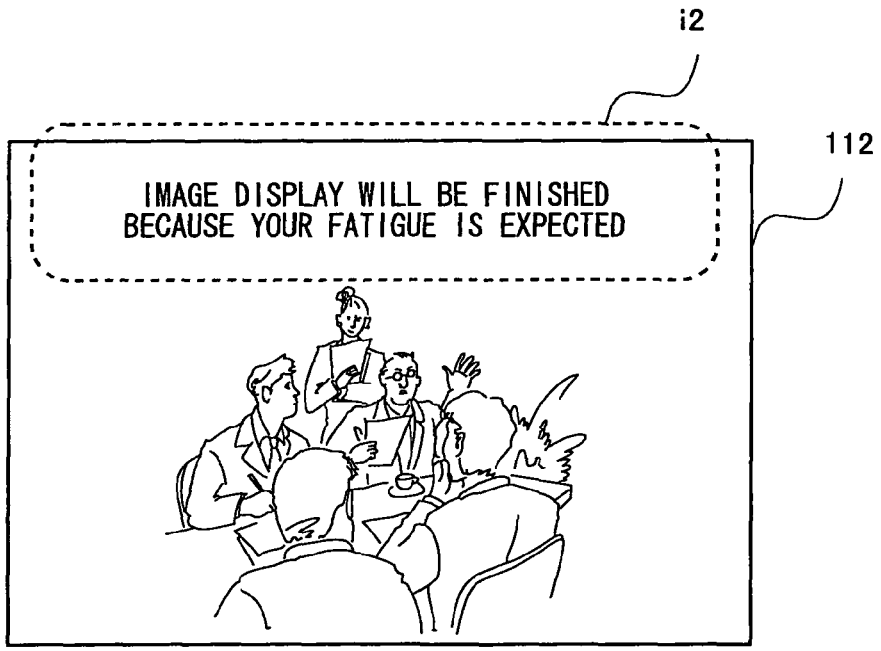

At Step S9, the controlling part 117 finishes the image reproduction via the display controlling part 114. When the content data of the object to be reproduced is image information with audio, the controlling part 117 finishes the audio reproduction via the speakers 111 as well. When the image reproduction is to be finished, an image (i2) notifying the user that the image reproduction will be finished may be displayed on a currently displayed image in a superimposed manner as shown in, for example, FIG. 7B. Another alternative structure may be to ask a user whether the image reproduction may be finished or not and finish the image reproduction after a user's permission is confirmed. The images (i1, i2, and later-described i3) are recorded in a not-shown memory in the controlling part 117 in advance.

As described above, according to the first embodiment, the displaying part displaying an image is provided, the use history of the displaying part is recognized, and based on the recognized use history, the permissible image watching time for the user is decided. Then, according to the decided permissible viewing time, the display of the image by the displaying part is stopped. Therefore, by deciding the permissible viewing time and stopping the display of the image according to each user's use history of the head mount display, it is possible to realize a fatigue countermeasure appropriate for the user.

Further, according to the first embodiment, the user is prompted to finish watching the image according to the decided permissible viewing time. Therefore, by deciding the permissible viewing time according to each user's use history of the head mount display and encouraging the user to finish watching the image, it is possible to realize a fatigue countermeasure appropriate for the user.

Further, according to the first embodiment, at least one of the number of times of use, the operating hours per use, the accumulated operating hours, and the time required for adjusting the displaying part before use is recognized as the use history. Therefore, it is possible to decide the permissible viewing time appropriate for the user.

Further, according to the first embodiment, when the image display by the displaying part is to be stopped, the stopping time decided according to the permissible viewing time is corrected. Therefore, it is possible to automatically stop the reproduction at an appropriate timing without making the user feel unpleasant.

Further, according to the first embodiment, the stopping time is corrected based on the information of the content data of an image which is an object to be displayed by the displaying part. Therefore, it is possible to automatically stop the reproduction according to the contents of the content data.

Further, according to the first embodiment, the scene change of the content data is detected and the stopping time is corrected based on the position of the scene change. Therefore, it is possible to automatically stop the reproduction in timing with the scene change of the content data.

Further, according to the first embodiment, the stopping time is corrected based on the control information of the content data appended to the content data. Therefore, it is possible to automatically stop the reproduction according to the content data.

Though the first embodiment describes the example where the number of times of use is used as the use history, it should be noted that the permissible viewing time may be decided based on one of the operating hours per use, the accumulated operating hours, and the time required for adjusting the displaying part before use. When the operating hours per use is short, it can be inferred that the user is keeping the moderate use in mind, and therefore the permissible viewing time may be set long. Further, as the accumulated operating hours are longer, it can be inferred that a user is more accustomed to using the head mount display, and therefore the permissible viewing time may be set long. When the operating hours per use are short, it is inferred that the user feels fatigue sooner, and therefore, the permissible viewing time is preferably set short even if the accumulated operating hours are long. Further, as the time required for adjustment is shorter, it can be inferred that the user is more accustomed to using the head mount display, and therefore, the permissible viewing time may be set long. Further, the permissible viewing time may be decided based on the combination of two or more factors among the number of times of use, the operating hours per use, the accumulated operating hours, and the time required for adjusting the displaying part before use. In this case, to decide the permissible viewing time, the priority sequence or weighting is set for the plural factors.

Figure 5:
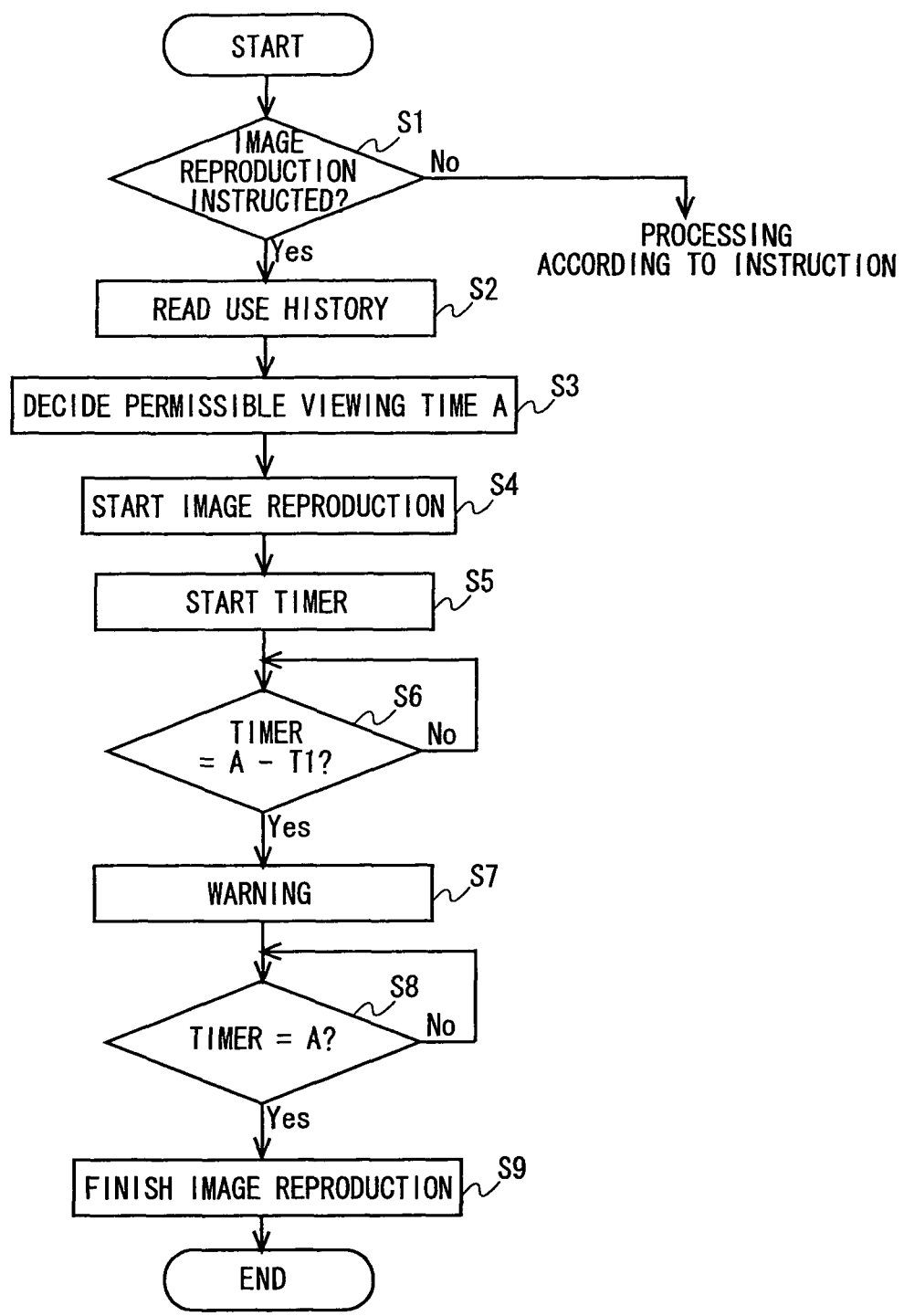
FIG. 5 is a flowchart showing the operation of a controlling part 117 when content data is reproduced.

Further, the first embodiment shows the example where the image reproduction is stopped at Step S9 after the warning is given at Step S7 in FIG. 5, but another alternative structure may be to give only the warning, or to stop the image reproduction without giving any warning.

Second Embodiment

Hereinafter, a second embodiment of the present invention will be described based on the drawings. In the second embodiment, only parts different from the first embodiment will be described. A head mount display of the second embodiment has the same structure as that of the head mount display 100 of the first embodiment. Therefore, the illustration of the head mount display of the second embodiment and description of its structure will be omitted, and in the following description, the same reference numerals and symbols as those in FIG. 1 and FIG. 3 of the first embodiment will be used.

The operation of the controlling part 117 at the time of content data reproduction in the second embodiment will be described by using the flowchart in FIG. 8.

At Step S21, the controlling part 117 determines whether or not image reproduction has been instructed via the operating part 113. When the image reproduction has not been instructed, the controlling part 117 executes the same processing as that of publicly known arts according to the instruction. For example, when audio reproduction is instructed, it executes the audio reproduction in the same manner as in the publicly known arts. When image reproduction is instructed, the controlling part 117 goes to Step S22.

At Step S22, the controlling part 117 obtains user information. This embodiment will describe an example where experience/inexperience of using an eyepiece optical instrument (such as a head mount display, a camera, a binocular, or a microscope) and age are obtained as the user information. The controlling part 117 displays the images shown in FIG. 9A and FIG. 9B on the displaying part 112 via the display controlling part 114 to prompt a user to input the user information. These images are recorded in the not-shown memory in the controlling part 117 in advance. The user inputs the user information by operating the operating part 113 while watching the displaying part 112. Incidentally, the user information may be input (obtained) in advance, instead of at this timing.

At Step S23, the controlling part 117 decides the permissible viewing time A. The controlling part 117 decides the permissible viewing time A based on the user information obtained at Step S22. The controlling part 117 records evaluation values corresponding to the user information in the not-shown memory in the controlling part 117 in advance. FIG. 9C shows an example of the evaluation values (F1 to F7). The controlling part 117 decides the permissible viewing time A based on the evaluation value. As the number of times the user has used an eyepiece optical instrument is larger, it can be inferred that the user is more accustomed to using the head mount display, and therefore, the evaluation value based on which the permissible viewing time A is set longer is prepared. Further, as the age is older, it can be inferred that the adjustment function or the like of eyes has been more deteriorated, and therefore, the evaluation value based on which the permissible viewing time A is set shorter is prepared. As in the first embodiment, it is preferable to set an upper limit to the permissible viewing time A in consideration of the fatigue of the user.

Further, when the permissible viewing time A is decided, the permissible viewing time A may be decided in consideration of a reproduction start point of the content data and information of the content data of the object to be reproduced as in the first embodiment. By deciding the permissible viewing time A in consideration of the information of the content data of the object to be reproduced, it is possible to stop the reproduction without making the user feel unpleasant, as in the first embodiment.

At Step S24, the controlling part 117 starts the image reproduction via the display controlling part 114. When the content data of the object to be reproduced is image information with audio, the controlling part 117 starts audio reproduction via the speakers 11 as well.

At Step S25, the controlling part 117 starts the timer in the controlling part 117.

At Step S26, the controlling part 117 determines whether or not the timer=A−T2. T2 is a predetermined time period (for example, "five minutes" or the like). The controlling part 117 waits until the timer=A−T2, and goes to Step S27 when determining that the timer=A−T2.

Figure 10A:
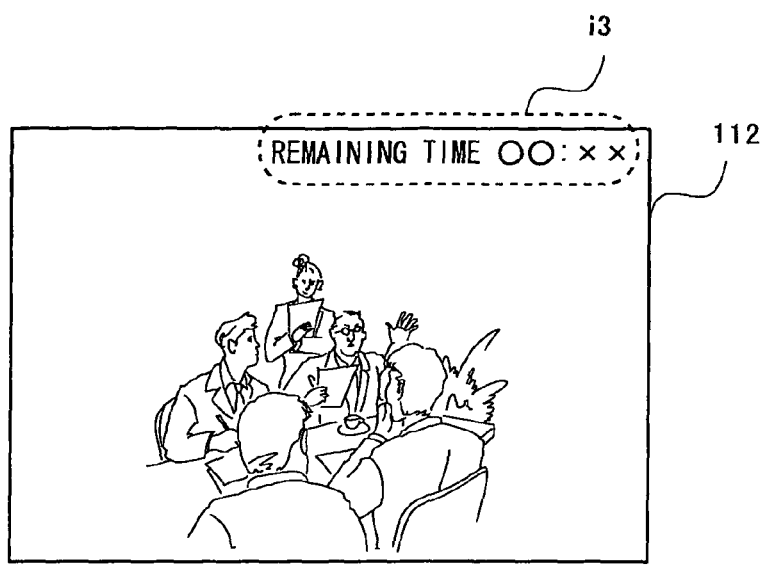
FIG. 10 are views showing display examples on the displaying part 112.

At Step S27, the controlling part 117 starts the display of the remaining time until the permissible viewing time A ends. As shown in FIG. 10A, the controlling part 117 displays the image (i3) showing the remaining time on a currently displayed image in a superimposed manner. Then, the display is changed with a decrease in the remaining time. The remaining time is displayed the time T2 prior to the end of the permissible viewing time A decided at Step S23. Instead of the display of the remaining time, audio information via the speakers 111 may be used. Audio in addition to the display of the remaining time may be used for notification. The images (i3, and later-described i4, i5) are recorded in the not-shown memory in the controlling part 117 in advance.

Figure 10B:
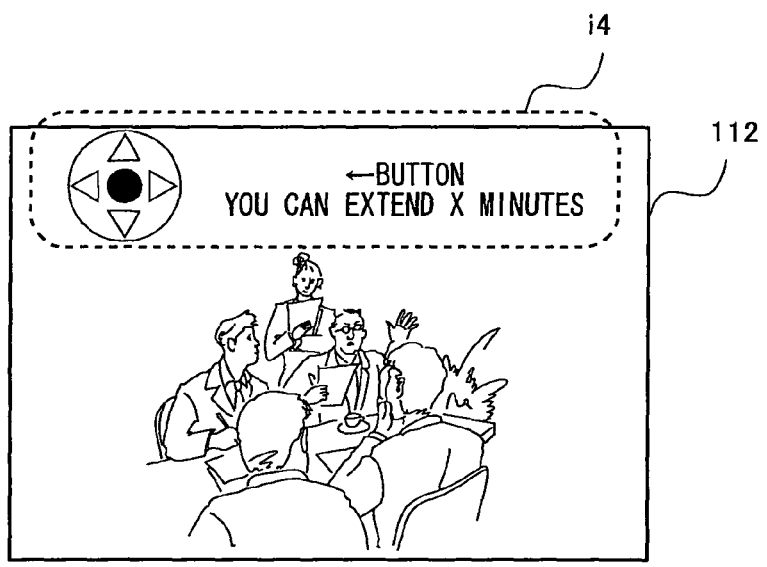

At Step S28, the controlling part 117 starts the acceptance by an extension button. The extension button is a button for accepting a user's instruction for extending the permissible viewing time A decided at Step S23. When feeling that the remaining time presented at Step S27 is not desirable, the user can extend the permissible viewing time A by a predetermined time length (for example, "ten minutes" or the like) by pressing the extension button. In this embodiment, the extension button is a button at the center of the cross button 113b of the operating part 113. Another member may be used as the extension button, or a dedicated extension button may be provided in the operating part 113. The acceptance by the extension button is started the time T2 prior to the end of the permissible viewing time A decided at Step S23. Further, at the start of the acceptance by the extension button, the image (i4) notifying the user of the start of the acceptance by the extension button may be displayed on a currently displayed image in a superimposed manner as shown in FIG. 10B, for instance.

At Step S29, the controlling part 117 determines whether or not the extension button has been pressed. When determining that the extension button has been pressed, the controlling part 117 goes to Step S30. On the other hand, when determining that the extension button has not been pressed even after waiting for a predetermined time, the controlling part 117 goes to Step S31 which will be described later.

At Step S30, the controlling part 117 corrects the timer or corrects the permissible viewing time A. The controlling part 117 subtracts a time length (for example, "ten minutes" or the like) pre-set for one pressing of the extension button from the timer or adds this time length to the permissible viewing time A, thereby correcting the permissible viewing time A.

At Step S31, the controlling part 117 determines whether or not the timer=A. When determining that the timer=A, the controlling part 117 goes to Step S32. On the other hand, when determining that the timer=A is not reached even after waiting for a predetermined time, the controlling part 117 returns to Step S29 to determine again whether or not the extension button has been pressed. That is, at Step S29 to Step S31, the controlling part 117 monitors whether or not the extension button has been pressed and at the same time monitors whether or not the timer=A.

Figure 10C:
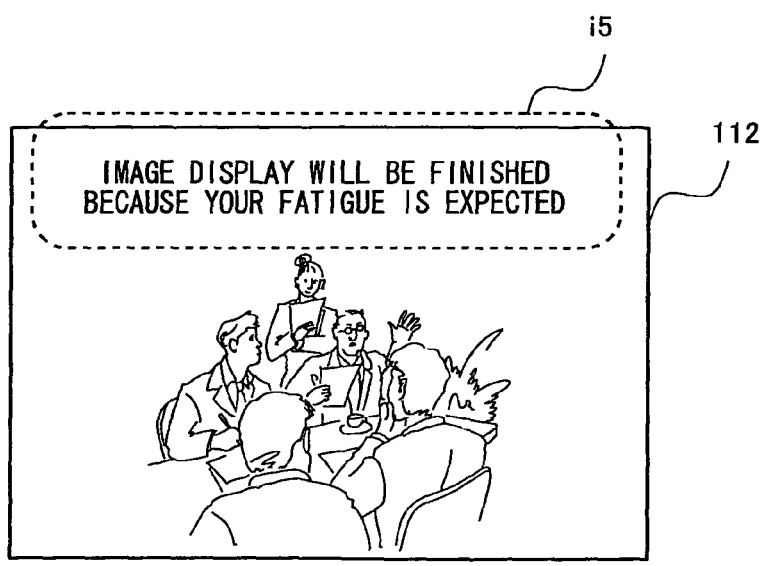

At Step S32, the controlling part 117 finishes the image reproduction via the display controlling part 114. When the content data of the object to be reproduced is image information with audio, the controlling part 117 finishes the audio reproduction via the speakers 111 as well. When the image reproduction is to be finished, the image (i5) notifying the user that the image reproduction will be finished may be displayed on a currently displayed image in a superimposed manner as shown in, for example, FIG. 10C. An alternative structure may be to ask the user whether the image reproduction may be finished or not and finish the image reproduction after a user's permission is confirmed.

As described above, according to the second embodiment, the displaying part displaying an image is provided, the user information is obtained, and based on the obtained user information, the permissible image watching time for the user is decided. Then, according to the decided permissible viewing time, the image display by the displaying part is stopped. Therefore, by deciding the permissible viewing time according to each use's user information and stopping the image display, it is possible to realize a fatigue countermeasure appropriate for the user.

Further, according to the second embodiment, the user is prompted to finish watching the image according to the decided permissible viewing time. Therefore, by deciding the permissible viewing time according to each user's user information and encouraging the user to finish watching the image, it is possible to realize a fatigue countermeasure appropriate for the user.

Further, according to the second embodiment, the user's experience/inexperience of using an eyepiece optical instrument is obtained as the user information. Therefore, it is possible to decide the permissible viewing time appropriate for the user.

Further, according to the second embodiment, at least one of sex and age of the user is obtained as the user information. Therefore, it is possible to decide the permissible viewing time appropriate for the user.

Further, according to the second embodiment, when the image display by the displaying part is to be stopped, the stopping time decided according to the permissible viewing time is corrected. Therefore, it is possible to automatically stop the reproduction at an appropriate timing without making the user feel unpleasant.

Further, according to the second embodiment, the accepting unit accepting a user's instruction for extending the stopping time is provided, and the stopping time is corrected based on the user's instruction. Therefore, it is possible to extend the image reproduction until such a timing that the user does not feel unpleasant, according to the contents or the like of the content data.

Though the second embodiment describes the example where the user information is the experience/inexperience of using an eyepiece optical instrument (such as a head mount display, a camera, a binocular, or a microscope) and age, but instead, the permissible viewing time may be decided based on sex of the user, whether or not the user wears eyeglasses, an eyesight correction state of right and left eyes of the user (such as difference depending on naked eye and corrected eye), a better eye of the user, a usage state, or the like. As for the usage state, by using, as the user information, whether or not the usage environment is a calm one such as a house, whether or not the user uses it away from home, or whether or not the eye opposite the displaying part 112 (right eye in this embodiment) is closed during the use, it is possible to realize a fatigue countermeasure more appropriate for the user. When the use environment is a calm one such as a house, the permissible viewing time is set longer than that in the case of the use away from home. Further, when the eye opposite the displaying part 112 is closed during the use, the user feels fatigue sooner than when he/she keeps his/her opposite eye open during the use, and therefore, the permissible viewing time is set shorter. Further, when the permissible viewing time is decided based on the combination of a plurality of factors, the priority sequence or weight is set for the plural factors in deciding the permissible viewing time.

Figure 8:
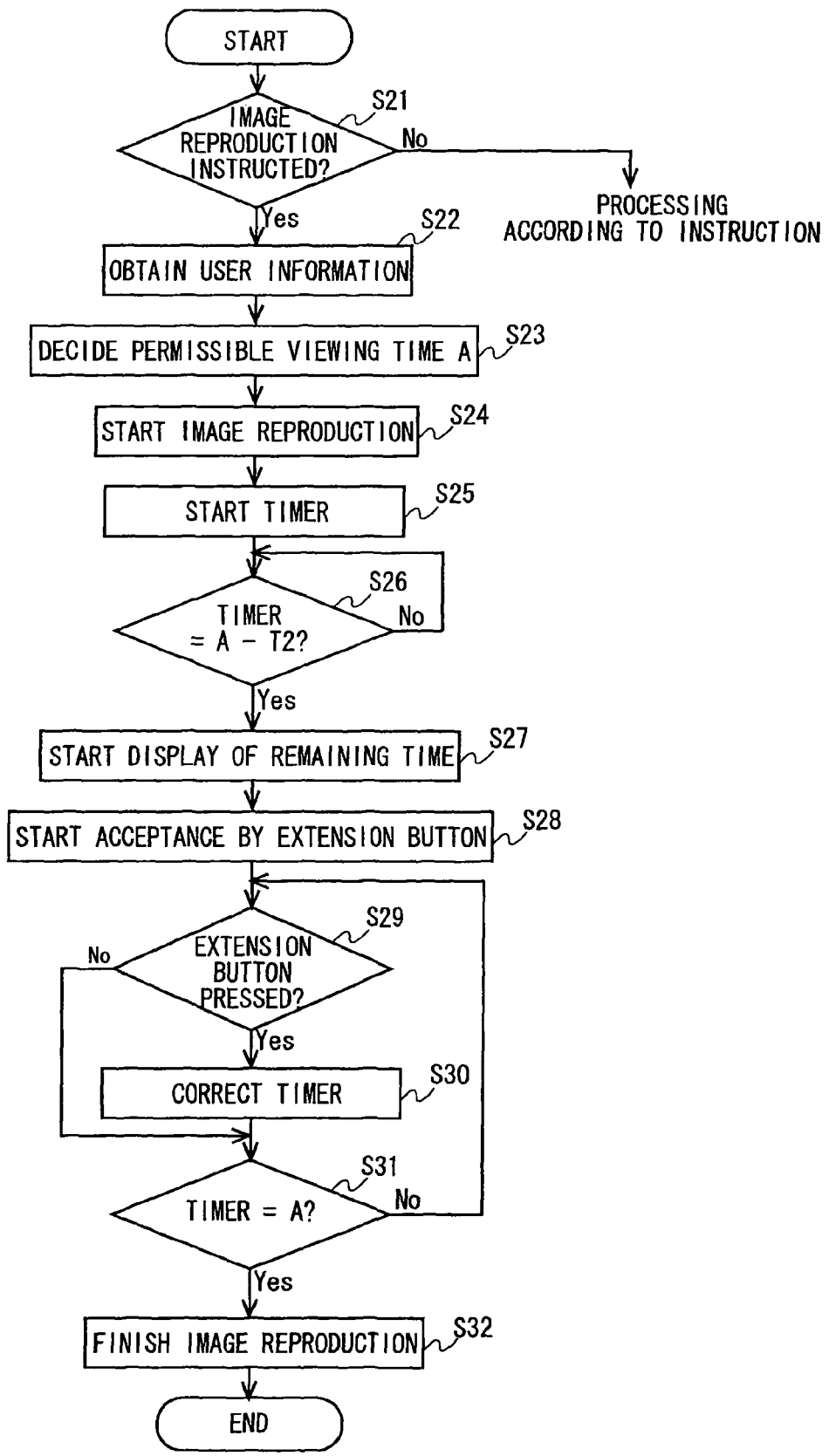
FIG. 8 is a flowchart showing the operation of the controlling part 117 when content data is reproduced.

Further, the second embodiment shows the example where the display of the remaining time is started at Step S27 in FIG. 8 and the image reproduction is stopped at Step S32, but another alternative structure may be to perform only the display of the remaining time, or to stop the image reproduction without performing the display of the remaining time.

Further, the second embodiment shows the example where the extension of the permissible viewing time is accepted by the extension button from an instant the time T2 prior to the end of the permissible viewing time to the end of the image reproduction, but another alternative structure may be to accept the extension of the permissible viewing time also after the end of the image reproduction. By thus accepting the user's instruction in a predetermined time period including at least one of periods before and after the permissible viewing time (predetermined stopping time), it is possible to extend the image reproduction until such a timing that the user does not feel unpleasant, according to the contents or the like of the content data even when the image reproduction is finished at a timing not desirable for the user. When the extension of the permissible viewing time is accepted after the end of the image reproduction, a still image is preferably displayed by a pause at the end of the image reproduction described at Step S32. Further, after the image reproduction is finished, it is preferable to accept the extension of the permissible viewing time only during a predetermined time period (for example, "three minutes" or the like).

Further, the first embodiment and the second embodiment show the examples where the permissible viewing time is decided every time the image is reproduced and the warning is given or the image reproduction is automatically stopped, but it is preferable to enable a user to select whether or not such a process is to be performed. Further, a method of deciding the permissible viewing time may be selectable by the user.

Further, the first embodiment and the second embodiment show the examples where, when the content data of the object to be reproduced is image information with audio, not only the image reproduction is finished but also the audio reproduction is finished according to the permissible viewing time, but another alternative structure may be to finish only the image reproduction and continue the audio reproduction. Further, the user may be allowed to select whether or not the audio reproduction is to be finished.

Further, the processes described in the first embodiment and the second embodiment may be combined to be executed. For example, based on the combination of the use history described in the first embodiment and the user information described in the second embodiment, the permissible viewing time may be decided.

Further, the inventions described in the first embodiment and the second embodiment are similarly applicable to a case where the reproduction of the content data is automatically stopped at a predetermined stopping time.

For example, the techniques relating to the method of determining the permissible viewing time and the extension of the permissible viewing time by the extension button which are described in the present invention are applicable to a case where the reproduction of the content data is automatically stopped according to a reduction in remaining capacity of a battery.

Figure 11:
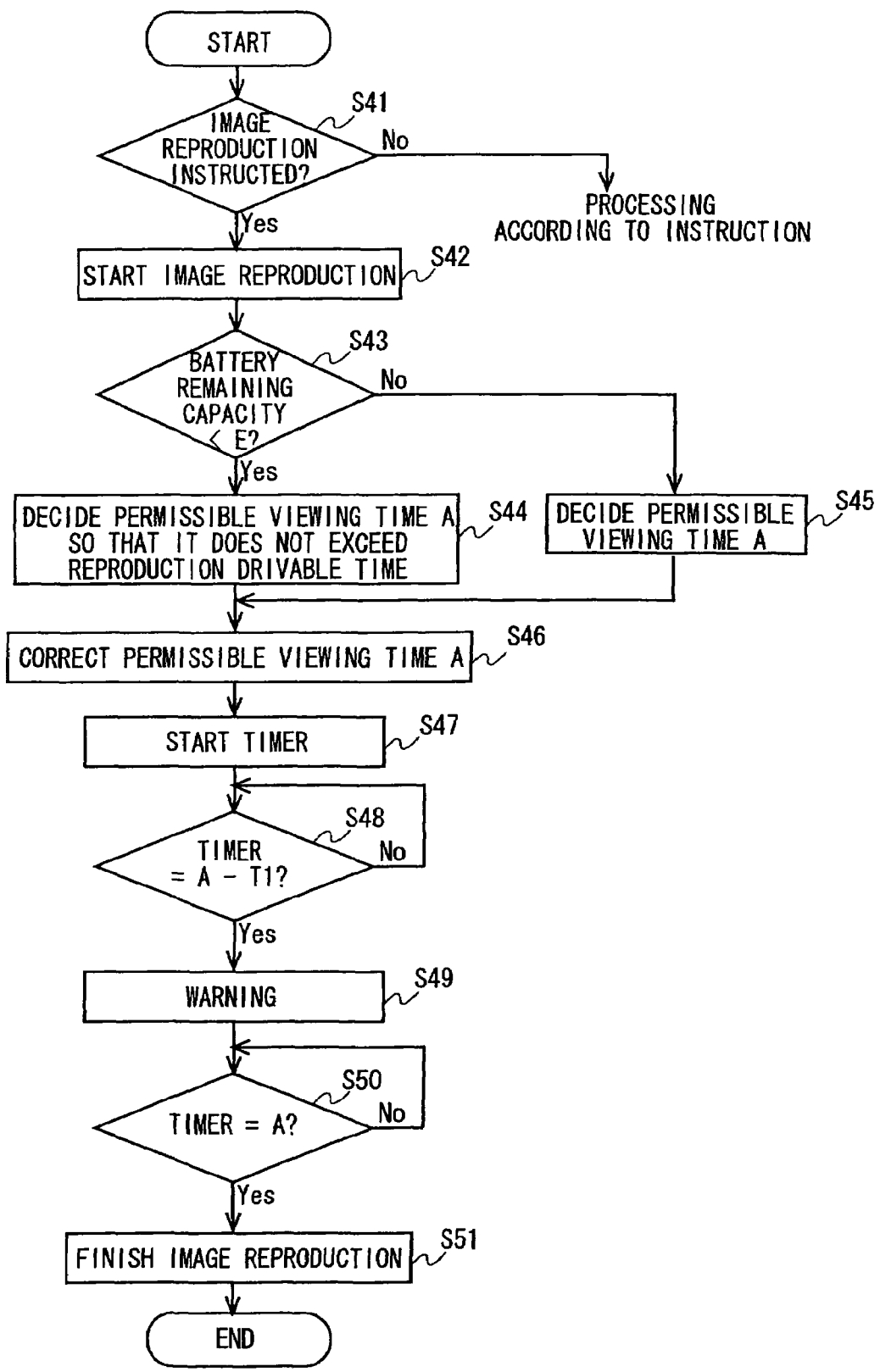
FIG. 11 is a flowchart explaining an application example of the present invention.

FIG. 11 is a flowchart showing the operation of the controlling part 117 when the image reproduction is stopped according to the reduction in remaining capacity of the battery.

At Step S41, the controlling part 117 determines whether or not image reproduction has been instructed via the operating part 113. When the image reproduction has not been instructed, the controlling part 117 executes the same processing as that of publicly known arts according to the instruction. For example, when audio reproduction is instructed, it executes the audio reproduction in the same manner as in the publicly known arts. When image reproduction is instructed, the controlling part 117 goes to Step S42.

At Step S42, the controlling part 117 starts the image reproduction via the display controlling part 114. When content data of an object to be reproduced is image information with audio, the controlling part 117 starts audio reproduction via the speakers 111 as well.

At Step S43, the controlling part 117 determines whether or not the battery remaining capacity<E. The battery remaining capacity E is a predetermined threshold value and, for example, is a value indicating the battery remaining capacity at which the user needs to be prompted to stop the image reproduction (for example, "image reproduction is possible for about another one hour" or the like). When determining that the battery remaining capacity<E, the controlling part 117 goes to Step S44, but goes to Step S45 when determining that the battery remaining capacity≥E.

At Step S44, the controlling part 117 estimates a reproduction drivable time based on the battery remaining capacity and decides the permissible viewing time A so that it does not exceed the reproduction drivable time.

At Step S45, the controlling part 117 decides the permissible viewing time A according to the battery remaining capacity, as in the first embodiment.

At Step S46, the controlling part 117 corrects the permissible viewing time A decided at Step S44 or Step S45. As described at Step S3 of the first embodiment, the controlling part 117 corrects the permissible viewing time A in consideration of information of the content data of the object to be reproduced. For example, the permissible viewing time A may be corrected based on control information of the content data appended to the content data, or another alternative may be to detect a scene change of the content data of the object to be reproduced and decide the permissible viewing time A based on the position of the scene change.

At Step S47 to Step S51, the controlling part 117 executes the same processes as those of Step S5 to Step S9 (FIG. 5) of the first embodiment.

With the above processes, even when the reproduction of the content data is automatically stopped, it is possible to stop the reproduction according to the reduction in the battery remaining capacity without making the user feel unpleasant.

When the technique relating to the extension of the permissible viewing time A by the extension button is applied to the case where the reproduction of the content data is automatically stopped according to the battery remaining capacity, it is preferable to prohibit the acceptance by the extension button according to the battery remaining capacity in order to prevent an excessive reduction in the battery remaining capacity due to the repeated pressing of the extension button.

Further, the techniques relating to the method of deciding the permissible viewing time A and the extension of the permissible viewing time A by the extension button which are described in the present invention are similarly applicable to the case where the image display is interrupted after a predetermined time has passed and the case where the image reproduction is stopped according to the permissible viewing time set by a user as described in the publicly known arts.

Figure 12:
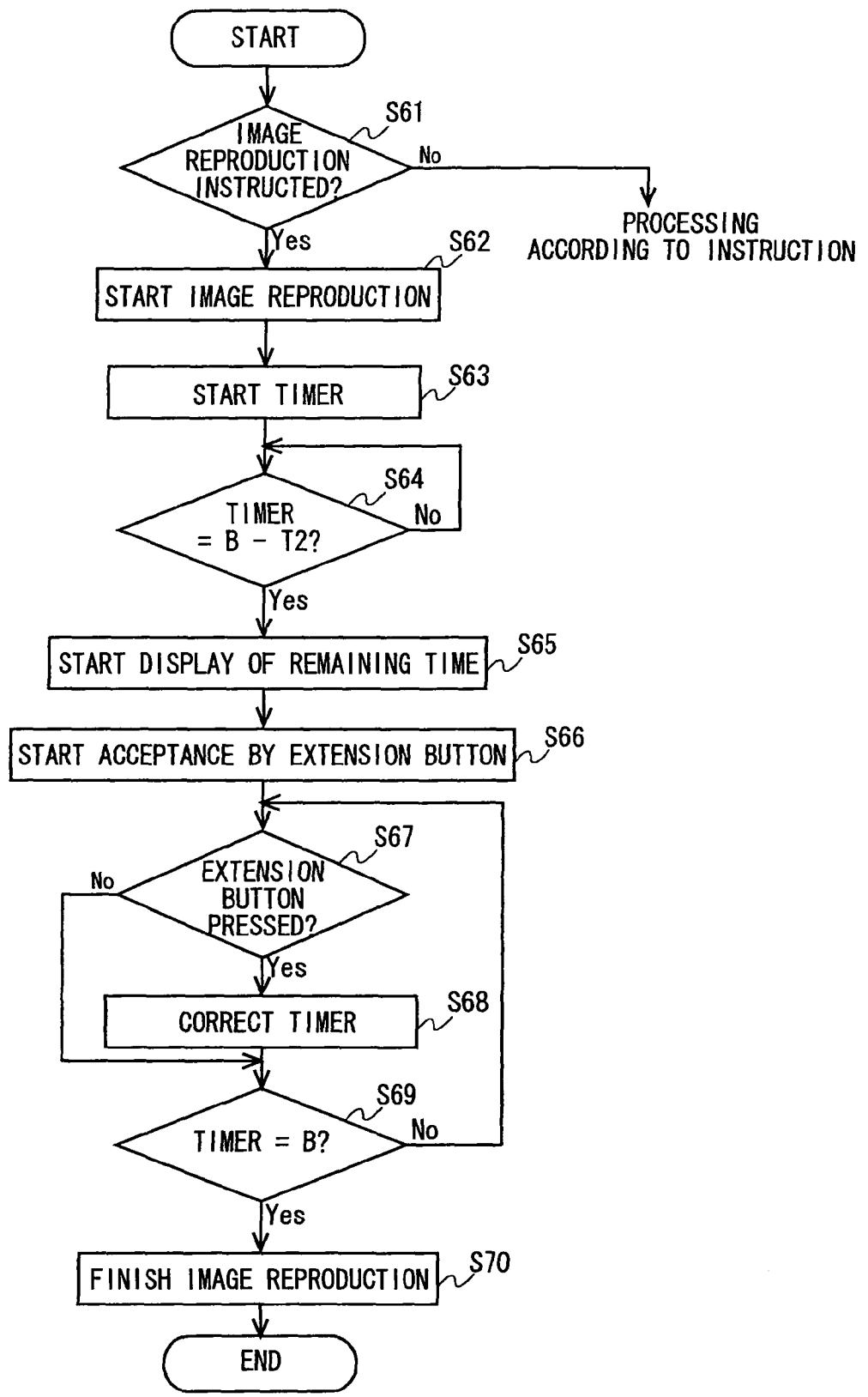
FIG. 12 is another flowchart explaining an application example of the present invention.

FIG. 12 is a flowchart showing the operation of the controlling part 117 when the image reproduction is stopped according to a time B pre-set by a user.

At Step S61, the controlling part 117 determines whether or not image reproduction has been instructed via the operating part 113. When the image reproduction has not been instructed, the controlling part 117 executes the same processing as that of publicly known arts according to the instruction. For example, when audio reproduction is instructed, it executes the audio reproduction in the same manner as in the publicly known arts. When image reproduction is instructed, the controlling part 117 goes to Step S62.

At Step 62, the controlling part 117 starts the image reproduction via the display controlling part 114. When content data of an object to be reproduced is image information with audio, the controlling part 117 starts audio reproduction via the speakers 111 as well.

At Step S63, the controlling part 117 starts the timer in the controlling part 117. As described at Step S3 of the first embodiment, the time B pre-set by the user may be corrected in consideration of information of the content data of the object to be reproduced. By correcting the time B pre-set by the user in consideration of the information of the content data of the object to be reproduced, it is possible to stop the reproduction without making the user feel unpleasant.

At Step S64 to Step S70, the controlling part 117 executes the same processes as those of Step S26 to Step S32 (FIG. 8) of the second embodiment.

With the above processes, when the reproduction of the content data is automatically stopped according to the time pre-set by the user, it is possible to extend the image reproduction until such a timing that the user does not feel unpleasant, according to the contents or the like of the content data, even when the image reproduction is finished at a timing not desirable for the user.

Further, the present invention is similarly applicable to a head mount display that automatically controls the reproduction of content data by program control according to a behavior pattern of a user.

Further, in the first embodiment and the second embodiment, if a plurality of users share the head mount display 100, the use history and the user information are recorded and managed on per user basis.

Further, the first embodiment and the second embodiment show the examples where the permissible viewing time or the like is measured by incrementing the count of the timer, but another alternative structure may be to set the start time of the timer to the permissible viewing time (time set by the user), decrement the count of the timer with time, and stop the image at an instant when the timer reaches 0.

Further, a publicly-known eyestrain relaxing mode may be provided in the head mount display 100 described in the first embodiment and the second embodiment. The eyestrain relaxing mode is a mode in which an image suitable for the recovery from the eyestrain is displayed on the displaying part 112, or the position on the displaying part 112 watched by the user is moved, thereby relaxing and straining a ciliary muscle of the user to help the user recover from the eyestrain. After the image reproduction is finished according to the permissible viewing time, the eyestrain relaxing mode may be automatically entered.

Further, a publicly-known eyestrain detecting mechanism may be mounted on the head mount display 100 described in the first embodiment and the second embodiment. The eyestrain detecting mechanism is a mechanism to detect a degree of eyestrain of a user based on, for example, the movement of user's eyelids, an amount of tears, an interference image generated in a tear film, a congestion degree of eyes, or the like. Then, based on the detection result of the eyestrain detecting mechanism, the aforesaid permissible viewing time may be corrected.

Further, in the first embodiment and the second embodiment, when the image reproduction is finished according to the permissible viewing time, the image reproduction may be prohibited for a predetermined time period (for example, two hours) thereafter.

Then, after the predetermine time period has passed, when it can be inferred that the user has recovered from the eyestrain to some degree, the image reproduction may be permitted again. Further, the image reproduction may be permitted again after it can be inferred from the aforesaid eyestrain detecting mechanism that the user has recovered from the eyestrain to some degree.

Further, the present invention is similarly applicable to a head mount display having a structure different from the structures described in the first embodiment and the second embodiment. For example, the present invention is similarly applicable to a head mount display whose displaying part is pulled out/in in a sliding manner, instead of a head mount display in an overhead arm shape whose displaying part is sprung up in the head top direction. Further, the present invention is similarly applicable to a head mount display which obtains content data of an object to be reproduced from an external reproduction apparatus (a DVD player or the like.

Further, the embodiments show the examples where the displaying part is provided only on one side, but the present invention is similarly applicable to a head mount display having the displaying parts on both sides.

Further, in the description of the first embodiment and the second embodiment, the head mount display is taken as an example, but the present invention is similarly applicable to a reproduction apparatus other than the head mount display. For example, the present invention is similarly applicable to a mobile phone, a mobile reproducing apparatus, a game machine, and the like which have an image reproducing function and an audio reproducing function.

The many features and advantages of the embodiments are apparent from the detailed specification and, thus, it is intended by the appended claims to cover all such features and advantage of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A head mount display reproducing both a first content data including an image and a second content data not including the image, the head mount display comprising:
   - a reproducing unit reproducing the first content data and the second content data;
   - a timer unit measuring a time that the reproducing unit reproduces the first content data;
   - a displaying unit displaying the image;
   - a recognizing unit recognizing a use history for multiple times of use of the displaying unit or a time required for adjusting the displaying unit before use;
   - a decision unit deciding a permissible viewing time of the image for a user based on the use history for multiple times of use or the time required for adjusting; and
   - a controlling unit stopping the display of the image by the displaying unit according to the time measured by the timer unit and the permissible viewing time, wherein
   the controlling unit determines whether reproduction of the first content data or reproduction of the second content data is instructed, and only when the reproduction of the first content data is instructed, the controlling unit corrects a stopping time decided (1) according to the permissible viewing time when stopping the display of the image by the displaying unit, (2) based on information of content data of the image which is an object to be displayed by the displaying unit, and (3) based on chapter information, which is different from the image information of the content data and is control information of the content data appended to the content data;

the recognizing unit recognizes a degree to which the user is accustomed to using the displaying unit based on one of a number of times of use of the displaying unit, operating hours per use, accumulated operating hours, and a time required for adjusting the displaying unit before use; and the decision unit decides a permissible viewing time of the image for the user based on the degree to which the user is accustomed to using the displaying unit.

2. A head mount display reproducing both a first content data including an image and a second content data not including the image, the head mount display comprising:

a reproducing unit reproducing the first content data and the second content data;

a timer unit measuring a time that the reproducing unit reproduces the first content data;

a displaying unit displaying the image;

a recognizing unit recognizing a use history for multiple times of use of the displaying unit or a time required for adjusting the displaying unit before use;

a decision unit deciding a permissible viewing time of the image for a user based on the use history for multiple times of use or the time required for adjusting; and a controlling unit encouraging the user to finish watching the image according to the time measured by the timer unit and the permissible viewing time, wherein the controlling unit determines whether reproduction of the first content data or reproduction of the second content data is instructed, and only when the reproduction of the first content data is instructed, the controlling unit corrects a stopping time decided (1) according to the permissible viewing time when stopping the display of the image by the displaying unit, (2) based on information of content data of the image which is an object to be displayed by the displaying unit, and (3) based on chapter information, which is different from the image information of the content data and is control information of the content data appended to the content data;

the recognizing unit recognizes a degree to which the user is accustomed to using the displaying unit based on one of a number of times of use of the displaying unit, operating hours per use, accumulated operating hours, and a time required for adjusting the displaying unit before use; and the decision unit decides a permissible viewing time of the image for the user based on the degree to which the user is accustomed to using the displaying unit.

3. The head mount display according to claim 1, wherein the recognizing unit recognizes at least one of a number of times of use, operating hours per use, and accumulated operating hours as the use history.

4. A head mount display reproducing both a first content data including an image and a second content data not including the image, the head mount display comprising:

a reproducing unit reproducing the first content data and the second content data;

a timer unit measuring a time that the reproducing unit reproduces the first content data;

a displaying unit displaying the image;

an obtaining unit obtaining (i) a user information indicating one of experience/inexperience of using an eyepiece optical instrument, age, sex, experience/inexperience of eyeglasses, eyesight correction state of right and left eyes, better eye, and usage state of a user, and (ii) information indicating a degree to which the user is accustomed to using the displaying unit;

a decision unit deciding a permissible viewing time of the image for a user according to (i) the user information indicating one of the experience/inexperience of using the eyepiece optical instrument, the age, the sex, the experience/inexperience of the eyeglasses, the eyesight correction state of the right and left eyes, the better eye, and the usage state of the user, and (ii) the information indicating the degree to which the user is accustomed to using the displaying unit; and a controlling unit stopping the display of the image by the displaying unit according to the time measured by the timer unit and the permissible viewing time, wherein the controlling unit determines whether reproduction of the first content data or reproduction of the second content data is instructed, and only when the reproduction of the first content data is instructed, the controlling unit corrects a stopping time decided (1) according to the permissible viewing time when stopping the display of the image by the displaying unit, (2) based on information of content data of the image which is an object to be displayed by the displaying unit, and (3) based on chapter information, which is different from the image information of the content data and is control information of the content data appended to the content data.

5. A head mount display reproducing both a first content data including an image and a second content data not including the image, the head mount display comprising:

a reproducing unit reproducing the first content data and the second content data;

a timer unit measuring a time that the reproducing unit reproduces the first content data;

a displaying unit displaying the image;

an obtaining unit obtaining (i) a user information indicating one of experience/inexperience of using an eyepiece optical instrument, age, sex, experience/inexperience of eyeglasses, eyesight correction state of right and left eyes, better eye, and usage state of a user, and (ii) information indicating a degree to which the user is accustomed to using the displaying unit;

a decision unit deciding a permissible viewing time of the image for a user based on (i) the user information indicating one of the experience/inexperience of using the eyepiece optical instrument, the age, the sex, the experience/inexperience of the eyeglasses, the eyesight correction state of the right and left eyes, the better eye, and the usage state of the user, and (ii) the information indicating the degree to which the user is accustomed to using the displaying unit; and a controlling unit encouraging the user to finish watching the image according to the time measured by the timer unit and the permissible viewing time, wherein the controlling unit determines whether reproduction of the first content data or reproduction of the second content data is instructed, and only when the reproduction of the first content data is instructed, the controlling unit corrects a stopping time decided (1) according to the permissible viewing time when stopping the display of the image by the displaying unit, (2) based on information of content data of the image which is an object to be displayed by the displaying unit, and (3) based on chapter information, which is different from the image information of the content data and is control information of the content data appended to the content data.

6. The head mount display according to claim 1, wherein the controlling unit detects a scene change of the content data to correct the stopping time based on a position of the scene change.

7. The head mount display according to claim 1 further, comprising
an accepting unit accepting a user's instruction for extending the stopping time, wherein
the controlling unit corrects the stopping time based on the user's instruction.

8. The head mount display according to claim 7, wherein the accepting unit accepts the user's instruction in a predetermined time period including at least one of periods before and after the stopping time.

9. The head mount display according to claim 1, further comprising
a selecting unit selecting whether or not control by the controlling unit is to be performed based on the user's instruction.

10. The head mount display according to claim 1, wherein the controlling unit corrects the stopping time to the end point of a chapter when the stopping time is in a middle of the chapter.

11. The head mount display according to claim 1, wherein the controlling unit corrects the stopping time to the start point of a chapter when the stopping time is in a middle of the chapter.

12. The head mount display according to claim 1, wherein the controlling unit corrects the stopping time to the start point of a chapter when the stopping time is before a center point of the chapter and corrects the stopping time to the end point of the chapter when the stopping time is after the center point of the chapter.

13. The head mount display according to claim 1, wherein
the recognizing unit recognizes a combination of two or more factors among a number of times of use of the displaying unit, operating hours per use, accumulated operating hours, and a time required for adjusting the displaying unit before use; and
the decision unit decides a permissible viewing time of the image for the user based on the combination of two or more factors among the number of times of use, the operating hours per use, the accumulated operating hours and the time required for adjusting the displaying unit before use.

14. The head mount display according to claim 4, wherein
the obtaining unit obtains a user information indicating a combination of two or more factors among the experience/inexperience of using an eyepiece optical instrument, the age, the sex, the experience/inexperience of eyeglasses, the eyesight correction state of the right and left eyes, the better eye, and the usage state of the user; and
the decision unit decides a permissible viewing time of the image for the user based on the user information indicating the combination of two or more factors among the experience/inexperience of using the eyepiece optical instrument, the age, the sex, the experience/inexperience of eyeglasses, the eyesight correction state of the right and left eyes, the better eye, and the usage state of the user.

\* \* \* \* \*